United States Patent [19]
Kobayashi

[11] Patent Number: 5,557,360
[45] Date of Patent: Sep. 17, 1996

[54] APPARATUS FOR CONTROLLING AN OPERATION OF A SHUTTER

[75] Inventor: Takumi Kobayashi, Sakado, Japan

[73] Assignee: Asahi Kogaku Kogyo Kabushiki Kaisha, Tokyo, Japan

[21] Appl. No.: 358,579

[22] Filed: Dec. 13, 1994

Related U.S. Application Data

[63] Continuation of Ser. No. 139,977, Oct. 21, 1993, abandoned, which is a continuation of Ser. No. 824,567, Jan. 23, 1992, abandoned.

[30] Foreign Application Priority Data

Jan. 23, 1991 [JP] Japan ................. 3-024991 U

[51] Int. Cl.$^6$ .................. G03B 9/08; G03B 9/58
[52] U.S. Cl. ........................... 354/230; 354/260
[58] Field of Search ................... 354/230, 236, 354/248, 260, 263, 267.1

[56] References Cited

U.S. PATENT DOCUMENTS

| | | | |
|---|---|---|---|
| 3,838,436 | 9/1974 | Ogihara et al. | 354/259 |
| 3,856,393 | 12/1974 | Ogihara et al. | 354/258 |
| 3,868,712 | 2/1975 | Biber | 354/230 |
| 3,911,458 | 10/1975 | Imai et al. | 354/230 |
| 3,927,415 | 12/1975 | Peterson | 354/230 |
| 4,044,368 | 8/1977 | Inoue | 354/267 |
| 4,212,522 | 7/1980 | Kitai et al. | 354/25 |
| 4,342,506 | 8/1982 | Johnson et al. | 354/27 |
| 4,727,389 | 2/1988 | Raschke | 354/402 |
| 5,023,648 | 6/1991 | Meguro et al. | 354/420 |
| 5,317,353 | 5/1994 | Kobayashi et al. | 354/266 |

FOREIGN PATENT DOCUMENTS 54-71626   6/1979   Japan.
1434668    5/1976   United Kingdom.

OTHER PUBLICATIONS

English Language Abstract of Japanese Publication No. 54-71626.

Primary Examiner—M. L. Gellner
Assistant Examiner—Nicholas T. Tuccillo
Attorney, Agent, or Firm—Greenblum & Bernstein P.L.C.

[57] ABSTRACT

A shutter operation control apparatus of the present invention includes at least two shutter sectors between which a size of an aperture is defined. The apparatus comprises a shutter control plate which is moved in one direction upon a shutter release operation, and a sector cam surface formed on the upper surface of the shutter control member. The sector cam surface is provided for changing the size of the aperture according to a profile of the sector cam surface. The profile includes a curved surface which is capable of reducing an opening rate of the aperture while the size of the aperture is set to be small.

21 Claims, 14 Drawing Sheets

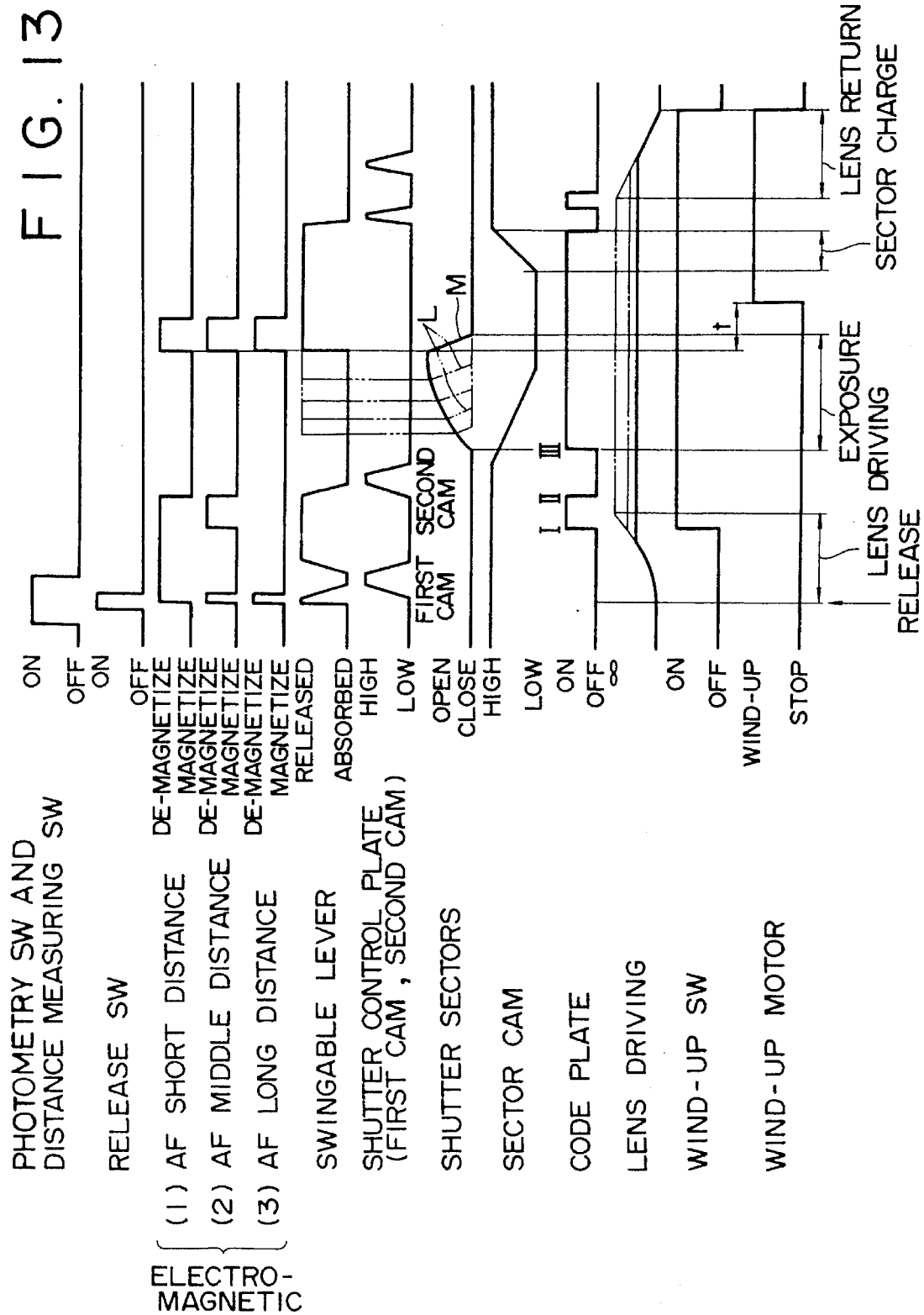

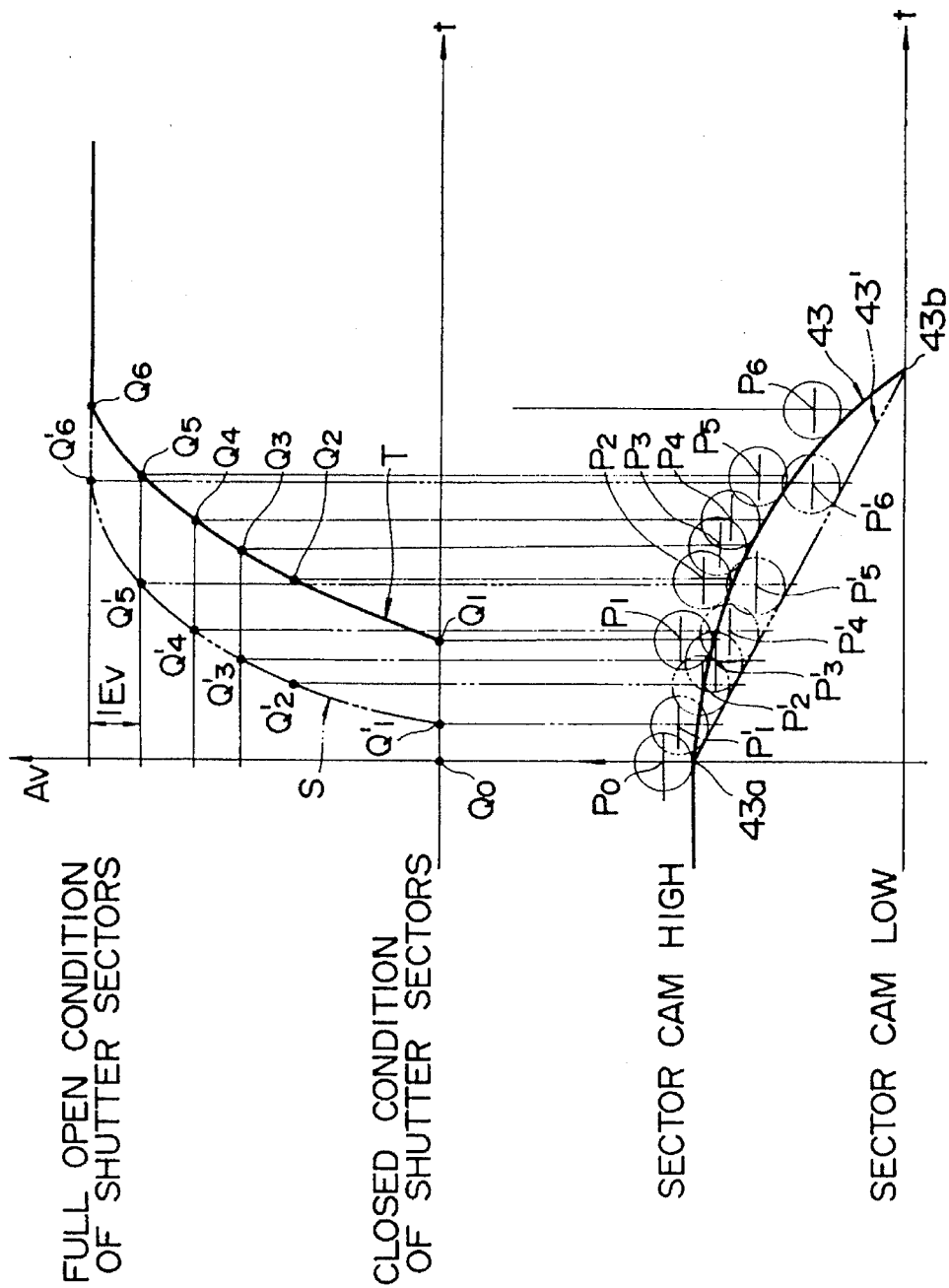

APPARATUS FOR CONTROLLING AN OPERATION OF A SHUTTER

This application is a continuation of application Ser. No. 08/139,977, filed Oct. 21, 1993, which is a continuation of U.S. application Ser. No. 07/824,567 filed Jan. 23, 1992, both now abandoned.

BACKGROUND OF THE INVENTION

The present invention relates to an apparatus for controlling an operation of a shutter, and more specifically, relates to an apparatus for controlling an opening operation of shutter sectors, provided in a camera with a lens shutter.

Conventionally, a shutter operation control apparatus is provided for controlling the opening/closing a lens shutter of a camera. The control apparatus is provided with a shutter control plate which controls the opening/closing shutter sectors or the exposure by moving it reciprocally. More specifically, the shutter control plate has a sector cam surface with which a pin of a sector lever coupled to the shutter sector is engaged. When the shutter control plate moves reciprocally, the sector ever swings according to the profile of the sector cam surface, thereby opening/closing the shutter sectors.

It should be noted that since the sector cam surface is formed on the shutter control plate only in a part and the profile of the sector cam surface is constituted by an inclined flat surface, the movement of the shutter control plate while the sector cam surface and the pin of the sector lever is engaged with each other is set to be a substantially constant-speed linear movement. Accordingly, the size of the aperture of the shutter suddenly becomes large at the commencement of the opening of the shutter; in other words, when the size of the aperture is set to be relatively small.

Consequently, in photographing under a high luminance where the size of the aperture is set to be small, an F-number will greatly change even though the opening rate of the aperture of the shutter sectors or the shutter speed is slightly increased or decreased. As a result, problems will arise where the dispersion of the exposure has happened, and the accuracy of the exposure has been lowered.

SUMMARY OF THE INVENTION

The present invention is conceived in view of the above mentioned circumstances, and it is therefore a primary object of the present invention to provide an apparatus for controlling an operation of a shutter, which can improve control accuracy of the exposure when photographing under a high luminance.

Further, it is a secondary object of the present invention to provide an apparatus for controlling operation of a shutter, which can reduce an opening rate of an aperture of the shutter sectors when the size of the aperture is set to be small.

In order to accomplish the above-mentioned objects, according to a first aspect of the present invention, there is provided an apparatus for controlling an operation of a shutter, including at least two shutter sectors between which the size of the aperture is defined, which apparatus comprises a shutter control member which is moved in one direction upon a shutter release operation, and a sector cam surface formed to the shutter control member, for changing the size of the aperture according to a profile of the sector cam surface. The profile is defined by a curved surface which is capable of reducing an opening rate of the aperture when the size of the aperture is set to be small.

According to a second aspect of the present invention, the profile of the sector cam surface is defined by an arcuate surface.

According to a third aspect of the present invention, the profile of the sector cam surface is defined by a quadric surface.

According to a fourth aspect of the present invention, the sector cam surface is formed on the outer periphery of the shutter control member.

According to a fifth aspect of the present invention, the shutter control member has an upper surface on which the sector cam surface is formed.

According to a sixth aspect of the present invention, the shutter control member is moved in a substantially straight path and by a substantially constant speed.

According to a seventh aspect of the present invention, the apparatus further comprises coupling means for coupling the sector cam surface with the shutter sectors, and includes a pin capable of contacting said sector cam surface. The size of the aperture is regulated by a contacting position of the pin with the sector cam surface.

According to an eighth aspect of the present invention, the size of the aperture is changed on the basis of the movement of the contacting position according to the movement of the shutter control member in one direction.

The above and other objects, features and advantages of the present invention will become apparent from the following detailed description which is to be read in conjunction with the accompanying drawings.

BRIEF DESCRIPTION OF DRAWINGS

FIG. 13 is a timing chart of the action of the controlling apparatus of this embodiment; and FIG. 14 is a view showing the change of the opening area of the shutter sectors and the profile of the sector cam surface.

DETAILED DESCRIPTION OF PREFERRED EMBODIMENT

Thereinafter, one embodiment of a shutter opening/closing control apparatus according to the present invention will be described in detail with reference to the drawings.

Figure 1:
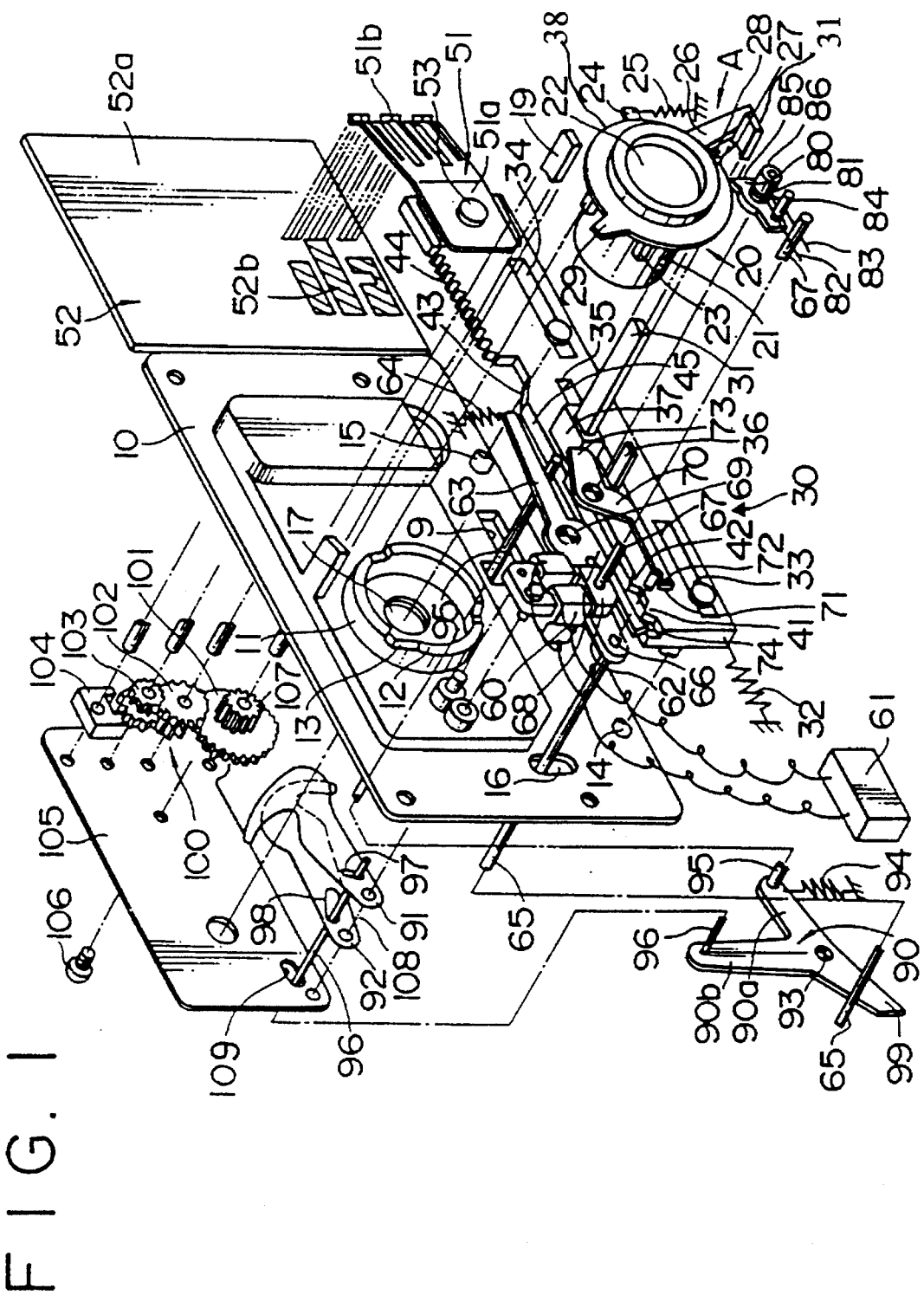
FIG. 1 is an exploded perspective view showing a shutter control apparatus equipped with a shutter opening/closing controlling apparatus of one embodiment according to the present invention.

FIG. 1 shows a shutter control apparatus of a camera equipped with a shutter lens and a shutter opening/closing control apparatus of one embodiment according to the present invention.

In FIG. 1, the shutter control apparatus is provided with a base plate 10 which is fixed to a front surface of a camera body (not shown) by screws. On the front surface of the base plate 10, a cylindrically shaped supporting portion 11 which has a central axis substantially aligned with an optical axis is integrally formed. The front end surface of the supporting portion 11 is constructed by a flat surface portion 12 parallel to the front surface of the base plate 10 and a plurality of recesses 13 equiangularly formed on the flat surface portion 12.

Figure 3:
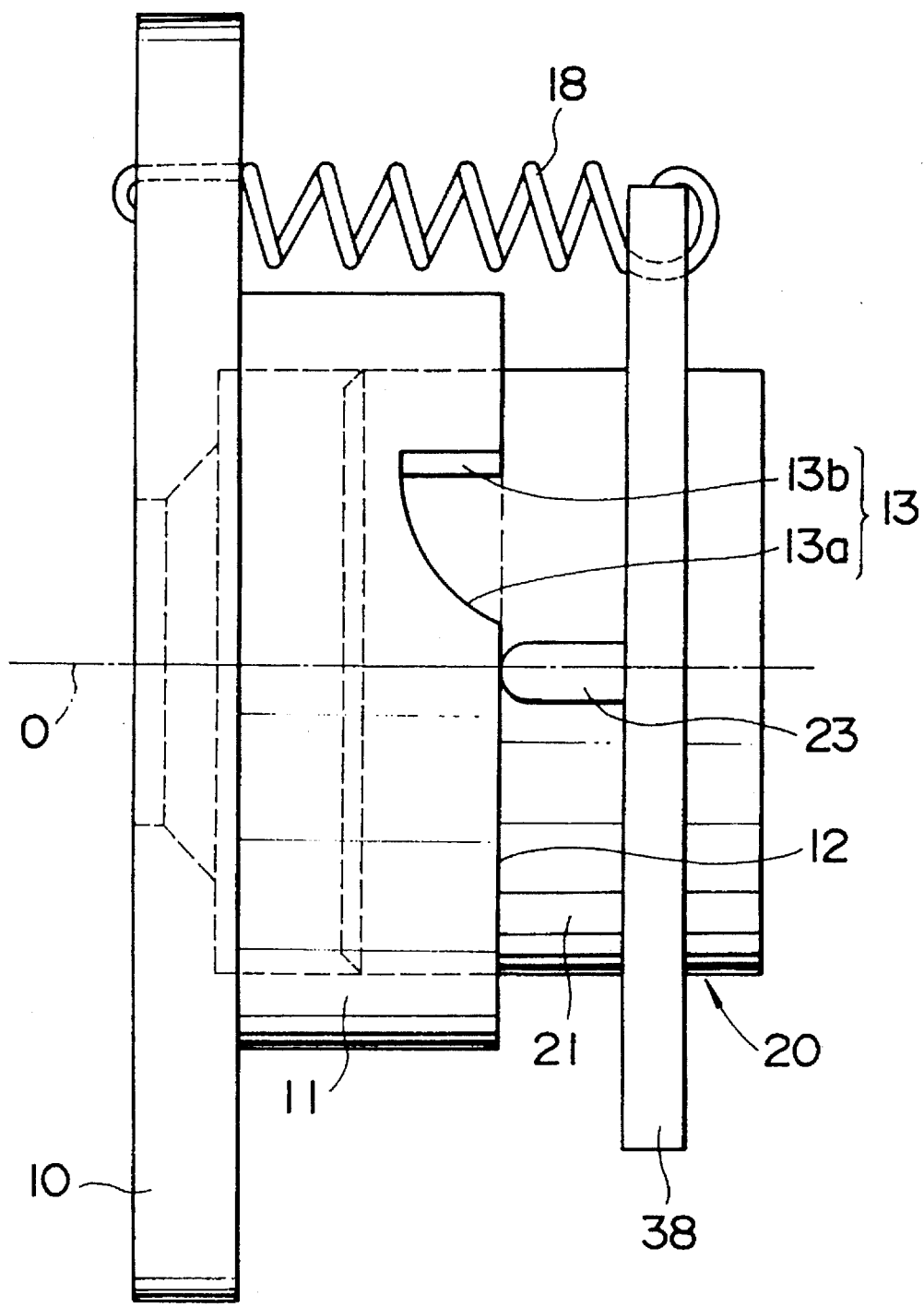
FIG. 3 is a side view showing a drawn-out condition of the lens.

In this embodiment, three recesses 13 are arranged which are 120 degrees apart. As shown in FIG. 3, each recess 13 comprises an inclined cam surface 13a and an upright surface 13b which is perpendicular to the flat surface portion 12. The depth of the cam surface 13a from the flat surface portion 12 is set to gradually increase in a clockwise direction.

A lens actuating member 20 includes a cylinder portion 21 in which a lens 22 is contained and by aligning the optical axis thereof with the central axis of the cylinder portion 21. The cylinder portion 21 is slidably fitted in the cylindrical supporting portion 11. Accordingly, the lens actuating member 20 is set to be rotatable about the optical axis of the lens 22 as well as movable in a direction of the optical axis.

The lens actuating member 20 further includes a plurality of axial protrusions 23 on the outer circumferential surface of the cylinder portion 21, each of which extends in a parallel direction with the optical axis and has a rounded back side end. In this embodiment, three axial protrusions 23 are equiangularly arranged and correspond to the three recesses 13.

First springs 18 are provided between the lens actuating member and the base plate 10 to urge the actuating member toward the base plate 10 in a direction A. The rounded ends of the axial protrusions 23 accordingly always contact the front end surface of the supporting portion 11 by means of the first springs As a result, the lens actuating member 20 is displaced in the direction of the optical axis in accordance with the angular position thereof, when it rotates about the optical axis thereof. That is, the axial position of the lens actuating member 20 is changed according to the shape (i.e., the profile) of the front end surface of the supporting portion 11.

A flange portion 38 is integrally formed on the outer periphery of the front end portion of the lens actuating member 20. First, second and third arms 24, 26 and 29, which extend in radial directions of the lens actuating member are integrally provided on the outer periphery of the flange portion 38. A second spring 25 is provided between the distal end of the first radial arm 24 and the camera body to urge the lens actuating member 20 to rotate about the central axis thereof in a clockwise direction when viewed in direction A. On the outer peripheral surface of the flange portion 38, first and second teeth 27 and 28 are formed, wherein the first tooth 27 is set to be adjacent to the second tooth 28 in the counterclockwise direction.

The extending directions of the second and third radial arms 26 and 29 are substantially opposite to each other, whereby the second and third radial arms 26 and 29 are substantially aligned. The second radial arm 26 is set to be capable of engaging an upright protrusion 31 which is fixed on a shutter control plate 30 to be described later. The third radial arm 29 is set to be capable of engaging with a stopper 19 which is formed on the base plate 10 and shown in FIG. 6.

The shutter control plate 30 is parallel to the base plate in front thereof. The shutter control plate 30 has a pair of first and second elongated holes 33 and 34 extending laterally in the lower portion thereof. A pair of first and second pins 14 and 15 formed on the front surface of the base plate 10 protrude through the elongated holes, respectively. The shutter control plate 30 is accordingly supported to be movable or reciprocal laterally by means of the insertion of the first and second pins 14 and 15 through the respective first and second elongated holes. The shutter control plate 30 is always urged by a third spring 32 to be displaced leftward in FIG. 1.

Formed on the upper surface of the shutter control plate 30 are a first cam surface 41, a second cam surface 42, a sector cam surface 43 and a rack 44 from the left to the right, in the mentioned order. More specifically, on the left end side of the upper surface of the shutter control plate 30, the first cam surface 41 is formed into a triangular shape when viewed from the front and whose summit is set above the middle point of the upper surface of cam surface 41, which is disposed on the upper surface of the shutter control plate 30. The first cam surface 41 is adjacent on the right side the second cam surface 42, which is formed substantially the same as the first cam surface 41.

On the substantially central portion of the upper surface of the shutter control plate 30, the sector cam surface 43 is formed which has a profile including an arcuate shape so as to expand upwardly. The profile of the sector cam surface 43 is characteristic for the present invention so that the description thereof will be described later in detail.

That portion of the upper surface of the shutter control plate 30 which is between the second cam surface 42 and the sector cam surface 43 is defined as a flat cam surface 45. It should be noted that the right end portion of the flat cam surface 45 is connected smoothly to the left end portion or the most upper portion of the sector cam surface 43. Further, the rack 44 is formed on the right end portion of the upper surface of the shutter control plate 30. Meshed with this rack 44 is a pinion gear 107 of a governor mechanism 100, which is provided for decelerating the moving speed of the shutter control plate 30 and the details of which will be described later.

Formed on the central portion in the front surface of time shutter control plate 30 is a third elongated hole 35 which extends laterally. A charge lever 36, which is linked with a wind-up motor (not shown) and driven to move rightward in FIG. 1, is inserted through the third elongated hole 35.

Formed on the front surface of the shutter control plate 30 at the upper position from the elongated hole 35 is an engaging block 37. An upright protrusion 81 extending in direction A is planted on the front surface of the engaging block 37. The engaging block 37 is set to be capable of engaging an engaging lever 70 to be described later. The upright protrusion 31 is set to be perpendicular to the front surface of the shutter control plate 30 and capable of engaging the engaging arm 26 of the lens actuating member 20.

The shutter control apparatus is further provided with a switching plate 51, which is fixed to one end (that is, the right end in FIG. 1) of the shutter control plate 30 by a screw 53. The switching plate 51 includes a plate member 51a fixed to the shutter control plate 30 and a plurality of brushes 51b projecting from the right end surface of the plate member. The switching plate 51 is set to be always in contact with a code plate 52, which constitutes another element of the shutter control apparatus and is fixed to the camera body (not shown).

The code plate 52 includes a plate member 52a fixed to the camera body and a plurality of contacts 52b, each of which has a predetermined shape or pattern for identifying the lateral position of the shutter control plate 30, and which are set to be capable of contacting the corresponding brushes 51b. The lateral position of the shutter control plate 30 (that is, a shutter condition) is detected through the specific contact condition between the brushes 51b of the switching plate 51 and the contacts 52b of the code plate 52.

The shutter control apparatus further includes an electromagnet 60 which is provided as the only actuator and is attached to the left portion of the front surface of the base plate 10 by screws (not shown). The electromagnet 60 is connected to an electromagnetic controlling circuit 61 which constitutes another element of the shutter control apparatus.

The electromagnet 60 is constructed so that it is magnetized to produce an attraction force. When it is de-energized, on the other hand, it is de-magnetized to remove the attraction force, when it is energized. In other words, the electromagnet 60 is of a so-called combination type. A movable block 62 is provided beneath the electromagnet 60 so as to be attracted to the electromagnet 60 by the attraction force when the electromagnetic 60 is de-energized and released therefrom when it is energized.

A swingable lever 63 is supported on that portion of the front surface of the shutter control plate 30 which is on the under side of the electromagnet 60. More specifically, the swingable lever 63 is rotatably supported by a first shaft 69 at a substantial center location thereof. The central axis of the first shaft 69 is set to extend in direction A. The movable block 62 is attached to the other end portion (that is, the left end portion) of the swingable lever 63.

A fourth spring 64 is provided between one end portion (that is, the right end portion) of the swingable lever 63 and the camera body to urge the swingable lever 63 to rotate in the counterclockwise direction about the first shaft 69. In other words, the other end of the swingable lever 63 is urged away from the electromagnet 60 by the urging force of the fourth spring 64.

A pair of third and fourth pins 65 and 66 are fixed to the other end (that is, the left end) of the swingable lever 63 so as to be aligned with each other in direction A. The third pin 65 on the back side extends through a vertically elongated hole 16 formed on the base plate 10, and the distal end thereof is set to be capable of engaging a sector lever 90, to be described later. The fourth pin 66 on the front side is set to be capable of engaging the engaging lever 70.

A fifth pin 67 is fixed to the front surface of the movable block 62 so as to extend in direction A. The fifth pin 67 is clamped between first and second arms 82 and 83. The first and second arms 82 and 83 are defined by two end portions of a fifth spring 81, which is attached to a latch lever 80, to be described later.

An engaging arm 68 is integrally formed with the swingable lever 63 so as to protrude from the substantially central position of the under surface thereof, and extend parallel thereto under the under surface. The engaging arm 68 is made to be flexible. The distal end (that is, the left end) of the engaging arm 68 has an engaging pawl 74, which is set to be capable of selectively engaging the first and second cam surfaces 41 and 42 of the shutter control plate 30.

The engaging lever 70 is rotatably supported on the base plate 10 at a middle point thereof by means of the first shaft 69 to which the swingable lever 63 is rotatably supported. A sixth spring 72 is provided between one end 71 (that is, the left end) of the engaging lever 70 and the fourth pin 66 so as to urge the engaging lever 70 to rotate in the clockwise direction; that is, to urge them in contact with each other. When the swingable lever 63 is rotated in the counterclockwise direction, the engaging lever 70 is also rotated in the counterclockwise direction by being pressed by the fourth pin 66.

The other end 73 (that is, the right end) of the engaging lever 70 is set to be capable of engaging the engaging block 37 which is provided on the shutter control plate 30. More specifically, the other end 73 of the engaging lever 70 will engage the left side surface of the engaging block 37 when the engaging lever 70 is rotated in the clockwise direction, thereby inhibiting the shutter control plate 30 from moving leftward. On the other hand, the other end 73 of the engaging lever 70 is free from engagement with the engaging block 37 when the engaging lever 70 is rotated in the counterclockwise direction, thereby allowing the shutter control panel to move leftward.

The latch lever 80 is rotatably supported on the base plate 10 at a middle point thereof by means of the first shaft 69, to which the swingable lever 63 and the engaging lever 70 are rotatably supported. A sixth pin 84 is fixed to one end (that is, the left end) of the front surface of the latch lever 80 so as to extend in direction A. A hook 85 is formed on the other end (that is, the right end) of the upper surface of the latch lever 80. The hook 85 is set to be capable of selectively engaging the first and second teeth 27 and 28.

The latch lever 80 has a hollow cylindrical portion 86 through which the first shaft 69 is rotatably inserted. The middle portion of the fifth spring 81 is wound around the cylindrical portion 86. The first and second arms 82 and 83 are set to pass over and under the sixth pin 84, respectively. Accordingly, both of the fifth and sixth pins 67 and 84 are elastically clamped by the first and second arms 82 and 83.

Consequently, when the swingable lever 63 rotates with the fifth pin 67, the latch lever 80 rotates with and integrally with the swingable lever 63 in the same direction, in which the swingable lever 63 rotates, by means of the sixth pin 84 and the fifth spring 81. On the other hand, the hook 85 of the latch lever 80 selectively engages the first and second teeth 27 and 28 when the electromagnet 60 is energized and therefore, the swingable lever 63 is rotated in the counterclockwise direction by the urging force of the fourth spring 64, and the fifth pin 67 accordingly moves downward.

The sector lever 90 is provided for driving a pair of first and second shutter sectors 91 and 92 to open/close with respect to each other, and is rotatably supported at a central portion thereof by a second shaft 93 which is attached to the camera body and extends in direction A. A sixth spring 94 is provided between the sector lever 90 and the camera body to urge the sector lever 90 to rotate in the clockwise direction about the second shaft 93.

The first and second shutter sectors 91 and 92 are rotatably supported at respective one ends thereof through a third shaft 108 which is provided between the base plate 10 and a cover plate 105, to be described later. The first and second shutter sectors 91 and 92 are provided just behind a through hole 17 which is formed on the central portion of the base plate 10. It should be noted that the size of the aperture of the through hole 17 is defined between the first and second shutter sectors 91 and 92.

The first shutter sector 91 has a first cam slot 97 which extends In a direction which is largely inclined in a counterclockwise direction with respect to the longitudinal direction thereof. On the other hand, the second shutter sector 92 has a second cam slot 98 which extends in a direction which is slightly inclined in a clockwise direction with respect to the longitudinal direction thereof.

The sector lever 90 has three arms 90a, 90b and 99 which are aniso-directionally extending in a plane which is set to be perpendicular to the central axis of the second shaft 93. Fixed on the distal ends of the first and second arms 90a and 90b are seventh and eighth pins 95 and 96, respectively, each of which extends in direction A.

The seventh pin 95 is set to protrude through a laterally elongated hole 9 which is formed on the base plate 10 and the distal end of the pin 95 is set to be capable of selectively engaging the flat cam surface 45 and the sector cam surface 43. On the other hand, the eighth pin 96 is set to be inserted through a hole 109 which is formed on the cover plate 105, and the first and second cam slots 97 and 98 in the order mentioned.

In this construction, when the eighth pin 96 is reciprocally displaced in accordance with the reciprocative rotation of the sector lever 90, the first and second shutter sectors 91 and 92 are opened and closed. More specifically, when the sector lever 90 is rotated in the clockwise direction, the eighth pin 96 is moved rightward. As a result, the first and second shutter sectors 91 and 92 are opened with respect to each other through the rightward movement of the eighth pin 96.

It should be noted that the aforementioned third pin 65 which is fixed to the swingable lever 63 is set to be capable of engaging the upper edge of the third arm 99 of the sector lever 90. When the third pin 65 is pressed downwards, the sector lever 90 is rotated in the counterclockwise direction against the urging force of the sixth spring 94 through the engagement between the third pin 65 and the upper edge of the third arm 99, and therefore, the eighth pin 96 is moved leftward. As a result, the first and second shutter sectors 91 and 92 are closed with respect to each other through the leftward movement of the eighth pin 96.

The governor mechanism 100 for decelerating the moving speed of the shutter control plate 30 includes a series of gears 101, 102 and 103, an pawl 104 and the pinion gear 107. The governor mechanism 100 is provided in a recess which is formed on the rear surface of the base plate 10 and is covered by the cover plate 105. That is, the governor mechanism 100 is clamped between the base plate 10 and the cover plate 105 which is secured to the base plate 10 by a screw 106.

The pawl 104 is set to be capable of engaging with each teeth of the gear 103 which is in the uppermost position. As conventionally known, the rotating speed of the gear 103 is decelerated by intermittently engaging the lower edge of the pawl 104 with each teeth of the gear 103. On the other hand, the pinion gear 107 is fixed to the lowermost gear 101 so as to set to be coaxial thereto. The pinion gear 107 is set to mesh with the rack 44 formed on the shutter control plate 30. According to this construction, the moving speed of the shutter control plate 30 in the lateral direction is decelerated by the governor mechanism 100.

The operation of this shutter control apparatus according to the embodiment will now be described with reference to FIGS. 2 through 14.

Figure 2:
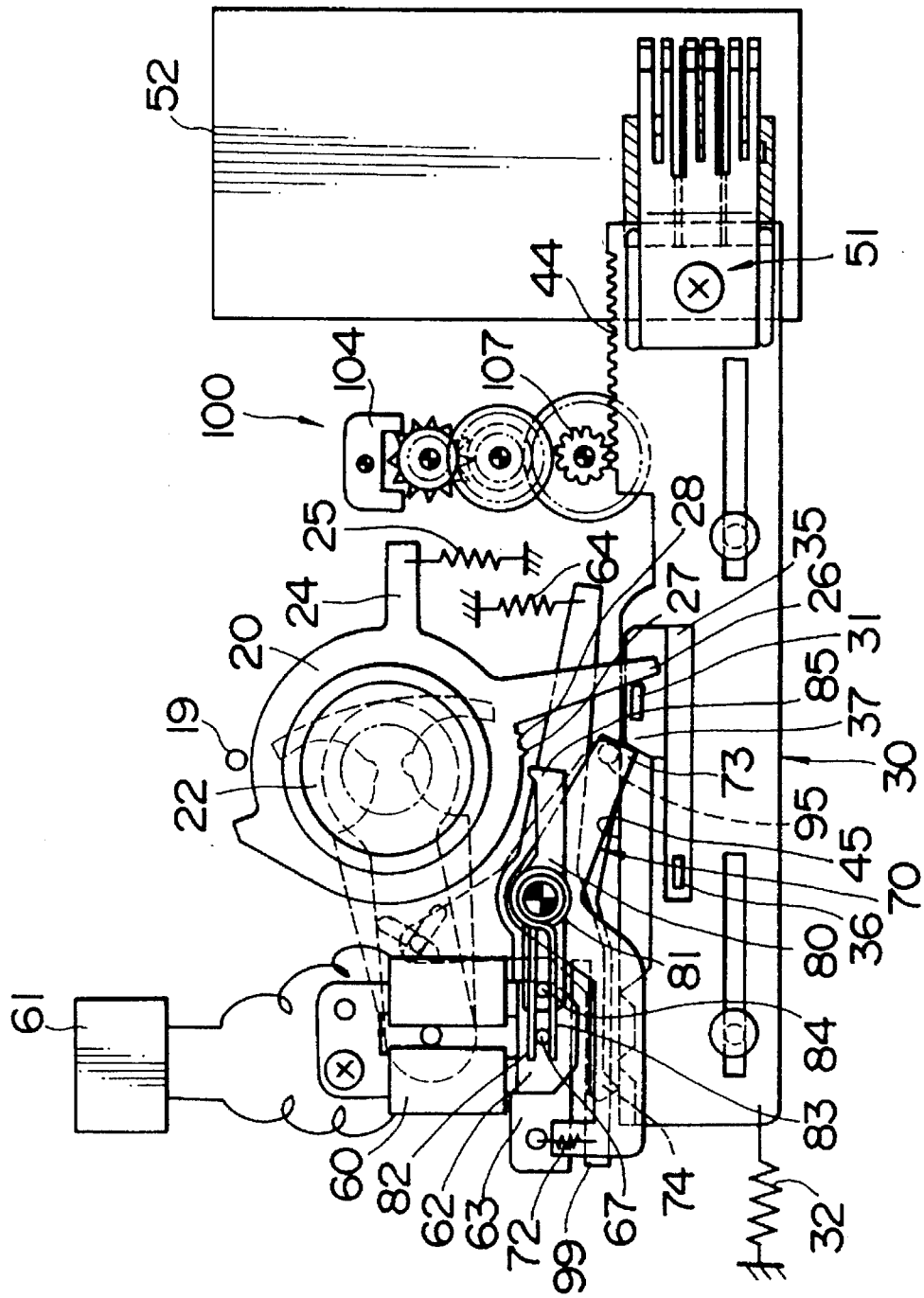
FIG. 2 is a front view showing a condition before a shutter release.
Figure 12:
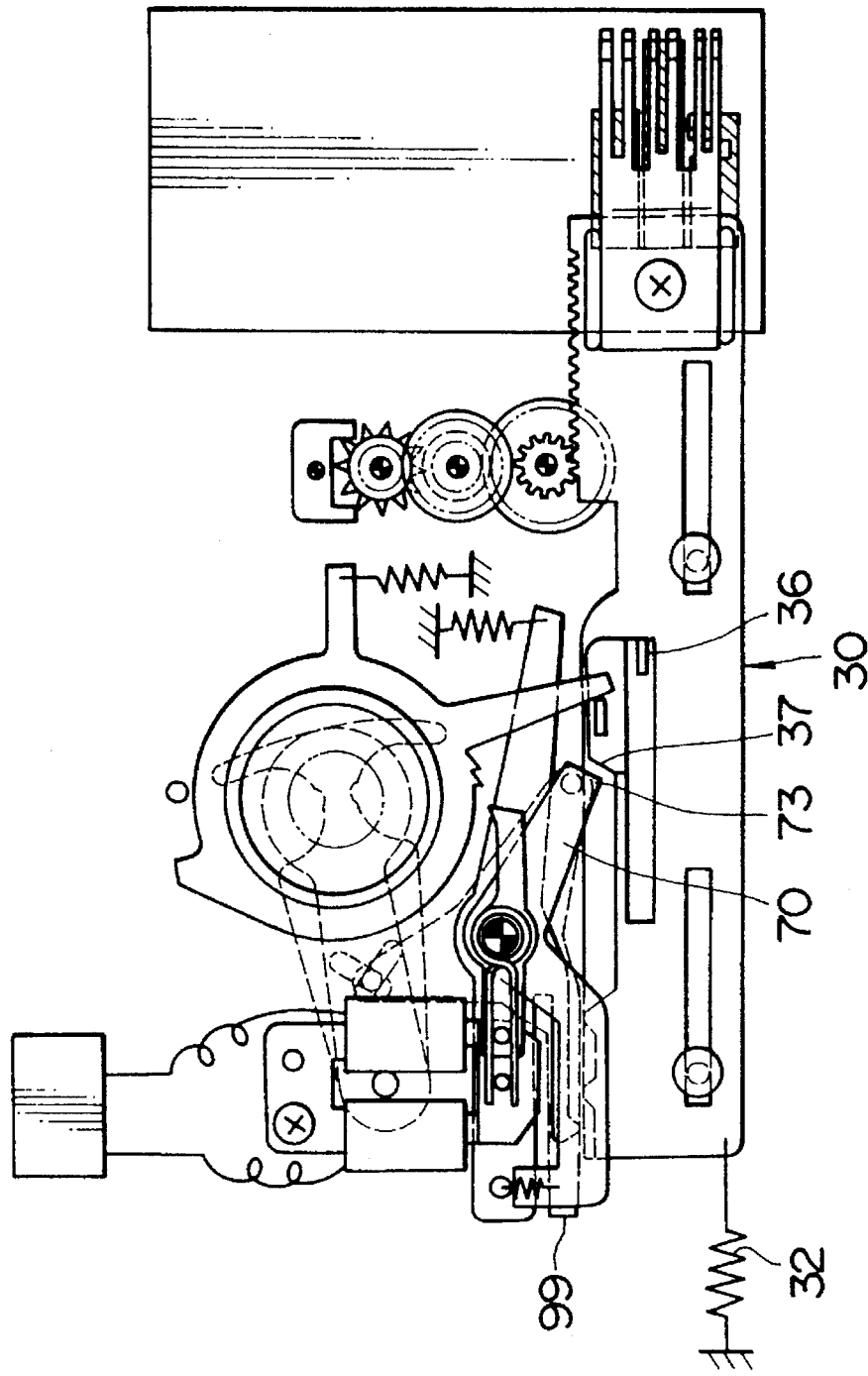
FIG. 12 is a front view showing a condition just before the charge action of the shutter control plate is established.

FIG. 2 shows a condition of the shutter control apparatus just before the shutter release operation. This pre-shutter release condition is established after the charge lever 36 has displaced the shutter control plate 30 rightward through the interconnection with the wind-up motor (not shown) as shown in FIG. 12, and then, returned leftward. In this pre-shutter release condition, the engaging block 37 of the shutter control plate 30 starts to engage the other end 73 of the engaging lever 70 against the urging force of the third spring 32, and is stopped in the engaging position. That is, the shutter control plate 30 is charged in the right side position in FIG. 2 against the urging force of the third spring 32 in the pre-shutter release condition.

In this condition shown in FIG. 2, a photometry switch and a distance measuring switch (both not shown) are turned on when the shutter button is half-depressed by the operator. As a result, the instant that the photometry and distance measuring switches are turned on, the calculation circuit (not shown) of the shutter control apparatus will start to perform the photometry and distance measurement.

In this moment, the second arm 26 of the lens actuating member 20 is pressed rightward by the upright protrusion 31 of the shutter control plate 30 which is moved rightward. Accordingly, the lens actuating member 20 is rotated about the optical axis of the lens 22 in the counterclockwise direction against the urging force of the second spring 25. As a result, the axial protrusions 23 of the lens actuating member 20 come into contact with the flat surface portion 12 of the supporting portion 11 as shown in FIG. 3, and therefore, the lens actuating member 20 or the lens 22 is set to be in the most drawn-out position.

In this condition shown in FIG. 3, the electromagnet 60 is not energized thereby producing the attraction force, that is to say, attracts the movable block 62 and holds it in the upper position. Accordingly, the swingable lever 63 is rotated in the clockwise direction about the first shaft 69 against the urging force of the fourth spring 64.

Further, since the fifth pin 67 which is fixed to the movable block 62 is set to be in the upper position, the latch lever 80 is rotated in the clockwise direction about the first shaft 69 by means of the sixth pin 84 which is clamped between the first and second arms 82 and 83 of the fifth spring 81. Consequently, the hook 85 of the latch lever 80 is moved to the lower position and released from both of the first and second teeth 27 and 28 of the lens actuating member 20.

On the other hand, the seventh pin 95 of the sector lever 90 is set to be engaged with the flat cam surface 45 of the shutter control plate 30. Accordingly, the sector lever 90 is rotated in the counterclockwise direction about the shaft 93 against the urging force of the sixth spring 94, so that the first and second shutter sectors 91 and 92 are closed with respect to each other and therefore close the through hole 17 of the base plate 10 through the eighth pin 96 fixed to the sector lever 90. In this closing condition, the third arm 99 of the sector lever 90 is remote downwardly from the third pin 65 of the swingable lever 63.

In the pre-shutter release condition, when the release switch is turned on, the electromagnet 60 is energized thereby to be de-magnetized as shown in FIG. 13. Accordingly, the attraction force of the electromagnet 60 for attracting the movable block 62 disappears. Consequently, swingable lever 63 is rotated in the counterclockwise direction about the first shaft 69 by the urging force of the fourth spring 64, as shown in FIG. 4.

It should be noted that in this embodiment, the shutter control apparatus is constructed so that it can perform an AF control with a so-called three step control, more specifically, a short distance control, a middle distance control, and a long distance control. In this condition, at first, the description will be given wherein it is assumed that the calculating circuit outputs a short distance signal at a distance measuring operation therein.

Figure 4:
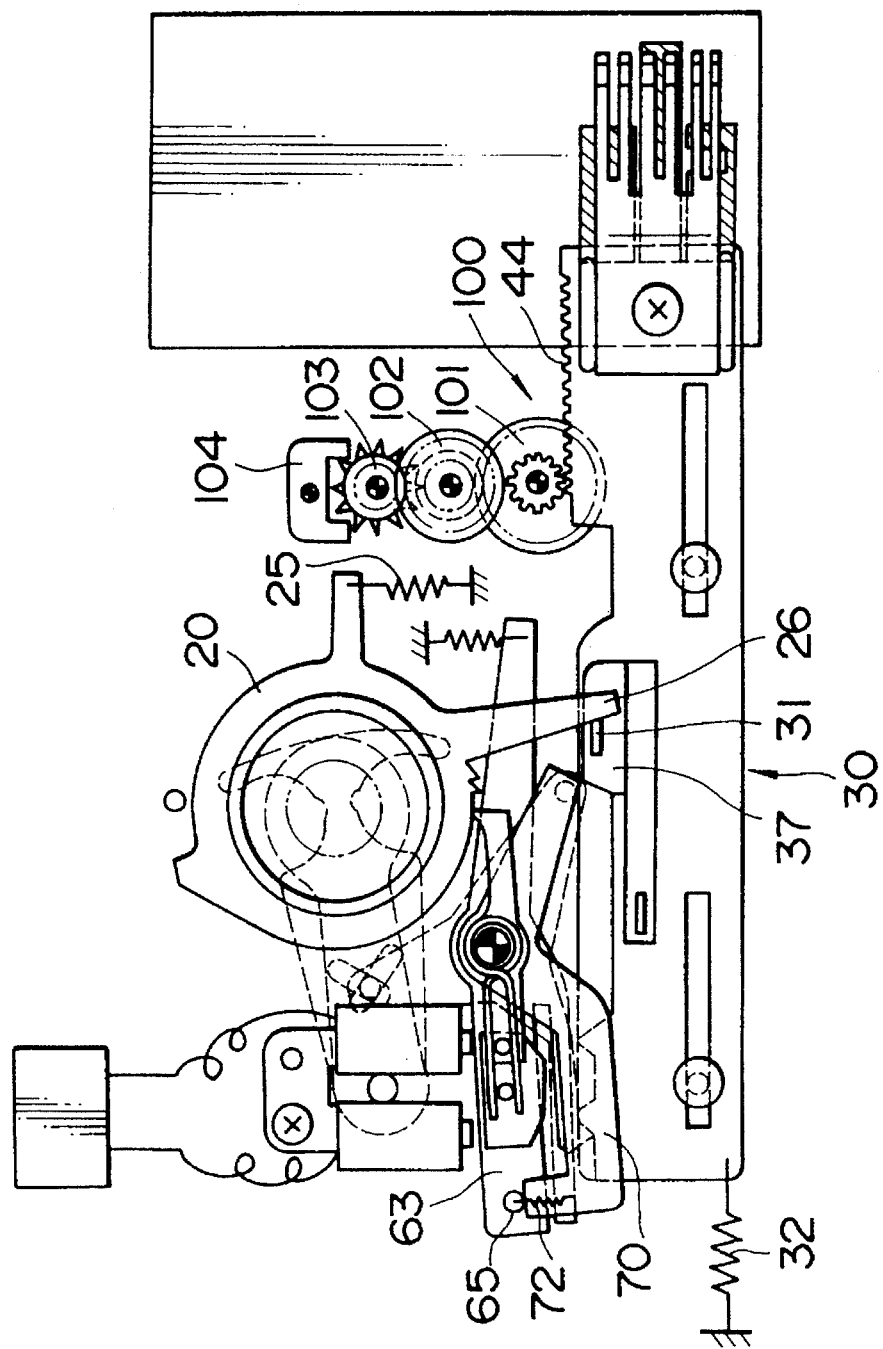
FIG. 4 is a front view showing a condition just after the shutter release.

FIG. 4 shows a condition just after the shutter release operation. In this condition shown in FIG. 4, when the swingable lever 63 is rotated in the counterclockwise direction about the first shaft 69 as mentioned above, the engaging lever 70 is also forced to rotated in the counterclockwise direction by being pressed by the fourth pin 66. Thus, the other end 73 of the engaging lever 70 is released from the engaging block 37, and consequently, the shutter control plate 30 starts to move leftward by the urging force of the third spring 32. In accordance with this leftward movement of the shutter control plate 30, the upright protrusion 31 is also moved leftward. As a result, the lens actuating member 20 starts to rotate in the clockwise direction about the optical axis of the lens 22 by the urging force of the second spring 25.

During the leftward movement of the shutter control plate 30, the rack 44 formed thereto and the pinion gear 107 of the governor mechanism 100 are intermeshed with each other; therefore, the governor mechanism 100 is actuated to decelerate the moving speed of the shutter control plate 30. Accordingly, the shutter control plate 30 moves slowly leftward being urged by the third spring 32.

Figure 5:
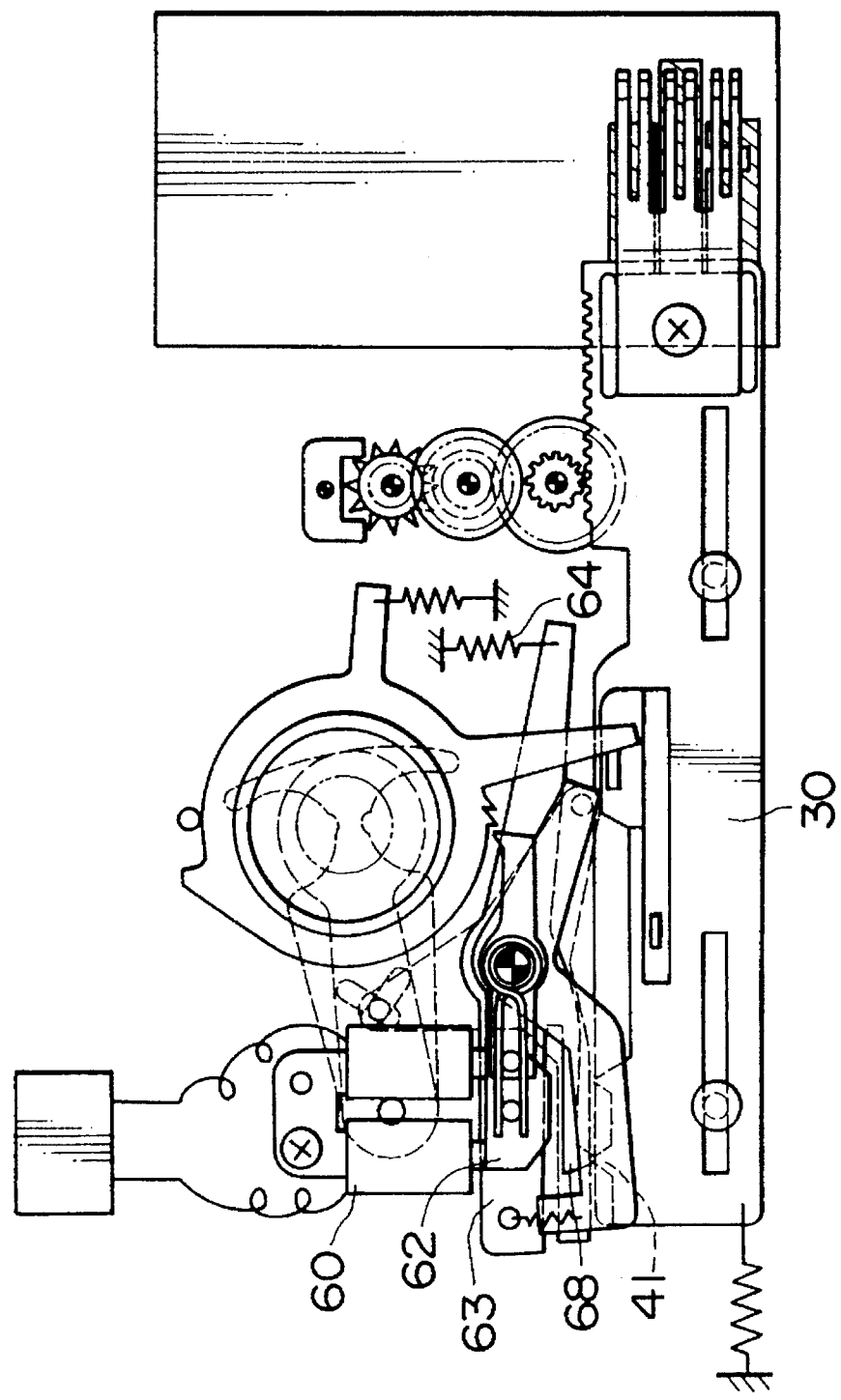
FIG. 5 is a front view showing a condition where the shutter control plate is moved further leftward from the position shown in FIG. 4.

FIG. 5 shows a condition where the shutter control plate 30 is moved further leftward from the position shown in FIG. 4. In this condition shown in FIG. 5, the engaging pawl 74 formed on the distal end of the engaging arm 68 attached to the swingable lever 63 is engaged with or rides on the summit of the first cam surface 41 of the shutter control plate 30.

Accordingly, the swingable lever 63 is forcibly rotated in the clockwise direction against the urging force of the fourth spring 64. That is to say, the movable block 62 fixed to the swingable lever 63 is set to be in a reset position where it contacts the electromagnet 60.

It should be noted that since the short distance photographing is assumed whereby the calculating circuit outputs the short distance signal, the electromagnet 60 is energized or de-magnetized as shown in FIG. 13 and therefore, does not produce the attraction force for the movable block 62.

Figure 6:
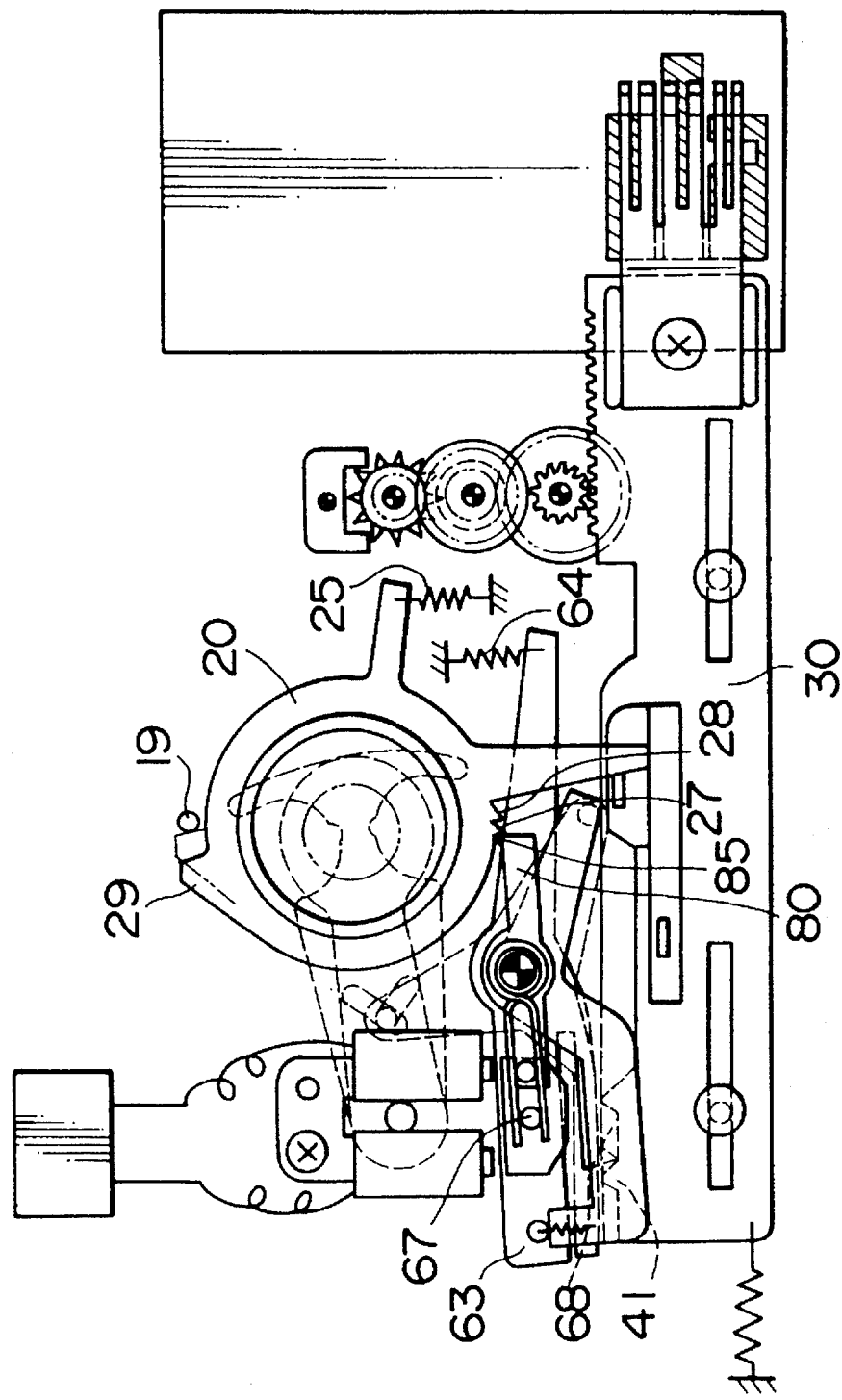
FIG. 6 is a front view showing a condition where the shutter control plate is moved further leftward from the position shown in FIG. 5, and performs an AF controlling function.

FIG. 6 shows a condition where the shutter control plate 30 is moved further leftward from the position shown in FIG. 5. By the leftward movement of the shutter control plate 30, the engaging pawl 74 of the engaging arm 68 is released from the first cam surface 41 and then the swingable lever 63 is rotated in the counterclockwise direction by the urging force of the fourth spring 64. Since the fifth pin 67 fixed to the movable block 62 is also rotated in the counterclockwise direction, the latch lever 80, which is coupled to the fifth pin 67 through the fifth spring 81, is accordingly rotated in the counterclockwise direction. The hook 85 of the latch lever 80 engages the first tooth 27 of the lens actuating member 20.

Figure 7:
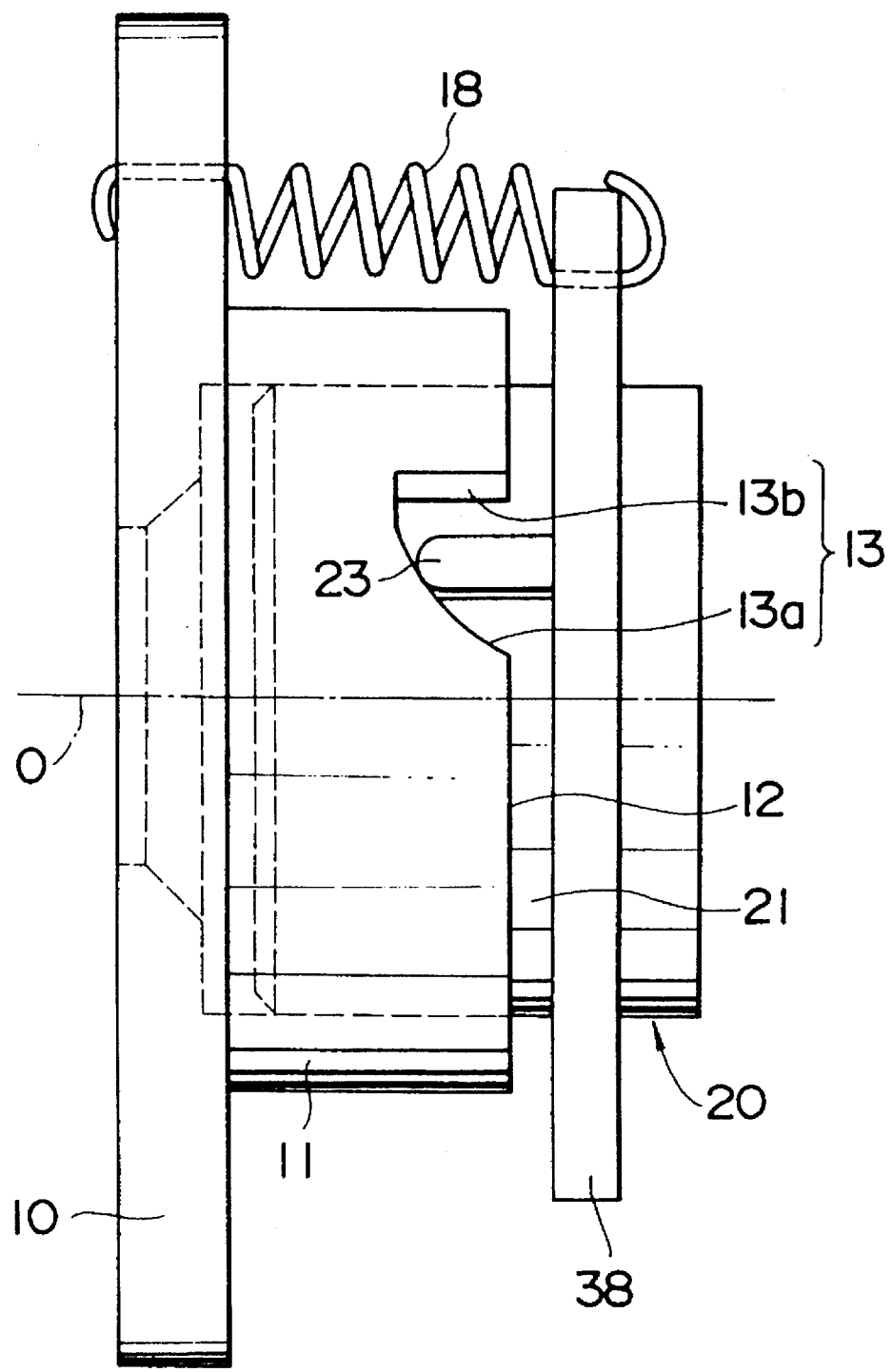
FIG. 7 is a side view showing a drawn-in condition of the lens.

As a result, the rotation of the lens actuating member 20 is stopped. In this stopped condition, the axial protrusions 23 come into be contact with the corresponding cam surfaces 13a formed on the front side surface of the supporting portion 11 of the base plate 10, as shown in FIG. 7. In other words, the lens actuating member 20 is moved to a position where the lens 22 is drawn-in, which is the position for the short distance photographing.

Figure 8:
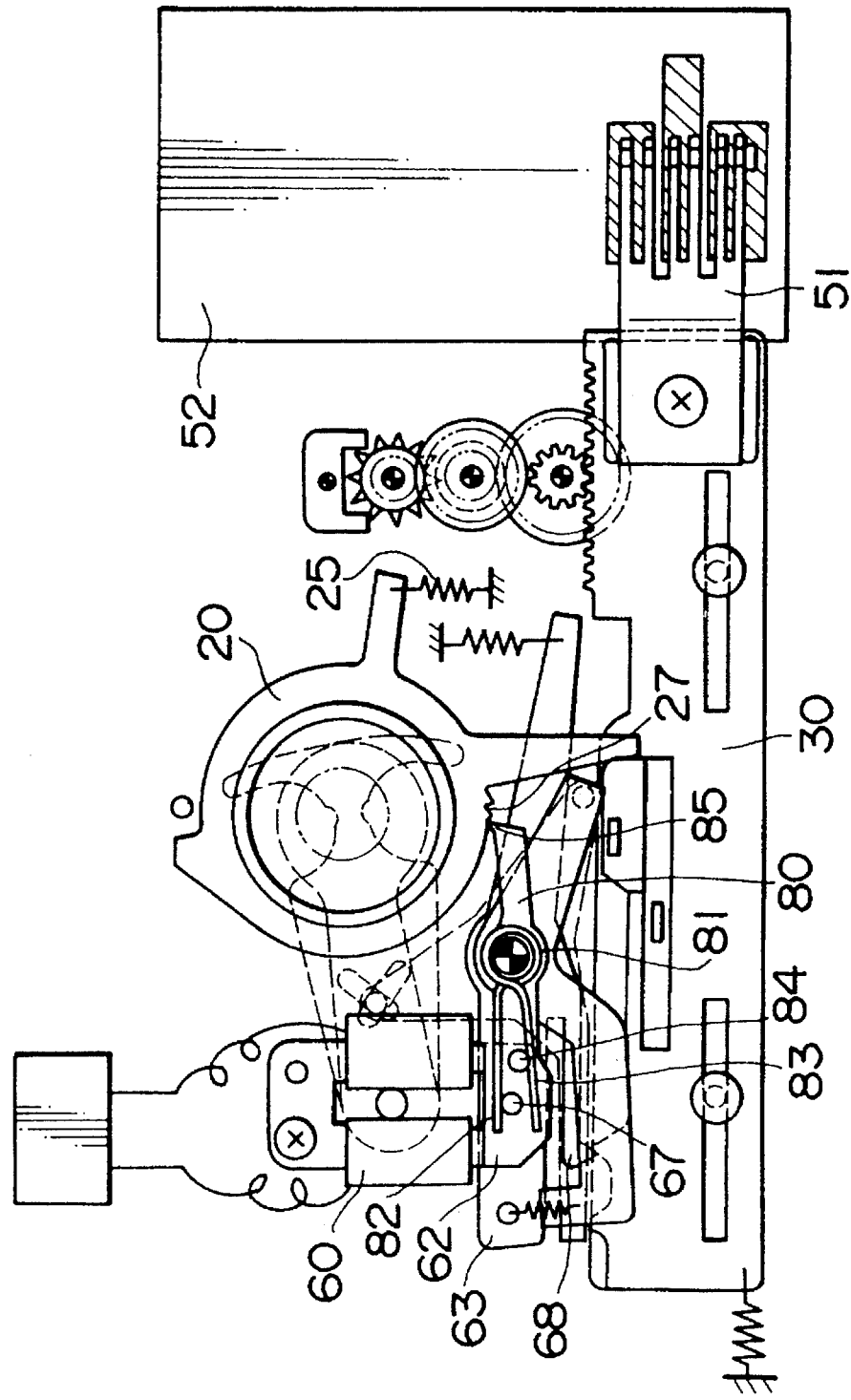
FIG. 8 is a front view showing a condition where the shutter control plate is moved further leftward from the position shown in FIG. 6.

FIG. 8 shows a condition where the shutter control plate 30 is further moved leftward from the position shown in FIG. 6. In this condition shown in FIG. 8, since the switching plate 51 is moved to that position on the code plate 52 of the shutter control circuit which is indicated by a reference symbol II in FIG. 13, the electromagnet 60 is de-energized or magnetized and therefore produces the attraction force to attract the movable block 62.

When the second cam surface 42 of the shutter control plate 30 comes into contact with the engaging pawl 74 of the engaging arm 68 of the swingable lever 63 and then the summit of the second cam surface 42 comes into engagement with the engaging pawl 74, the swingable lever 63 is rotated in the clockwise direction and the movable block 62 attached to the swingable lever 62 forcibly contacts to the electromagnet 60.

On the other hand, since the hook 85 of the latch lever 80 engages the first tooth 27 of the lens actuating member 20 and the lens actuating member 20 is urged to rotate in the clockwise direction by the urging force of the second spring 25, the latch lever 80 is prevented from rotating in the clockwise direction. Accordingly, the first or upper arm 82 of the fifth spring 81 is bent upward by the fifth pin 67 of the movable block 62, while the second or lower arm 83 is set to be stationary in its lower position by the sixth pin 84 fixed to the latch lever 80. Consequently, the first and second arms 82 and 83 are opened with respect to each other.

Figure 9:
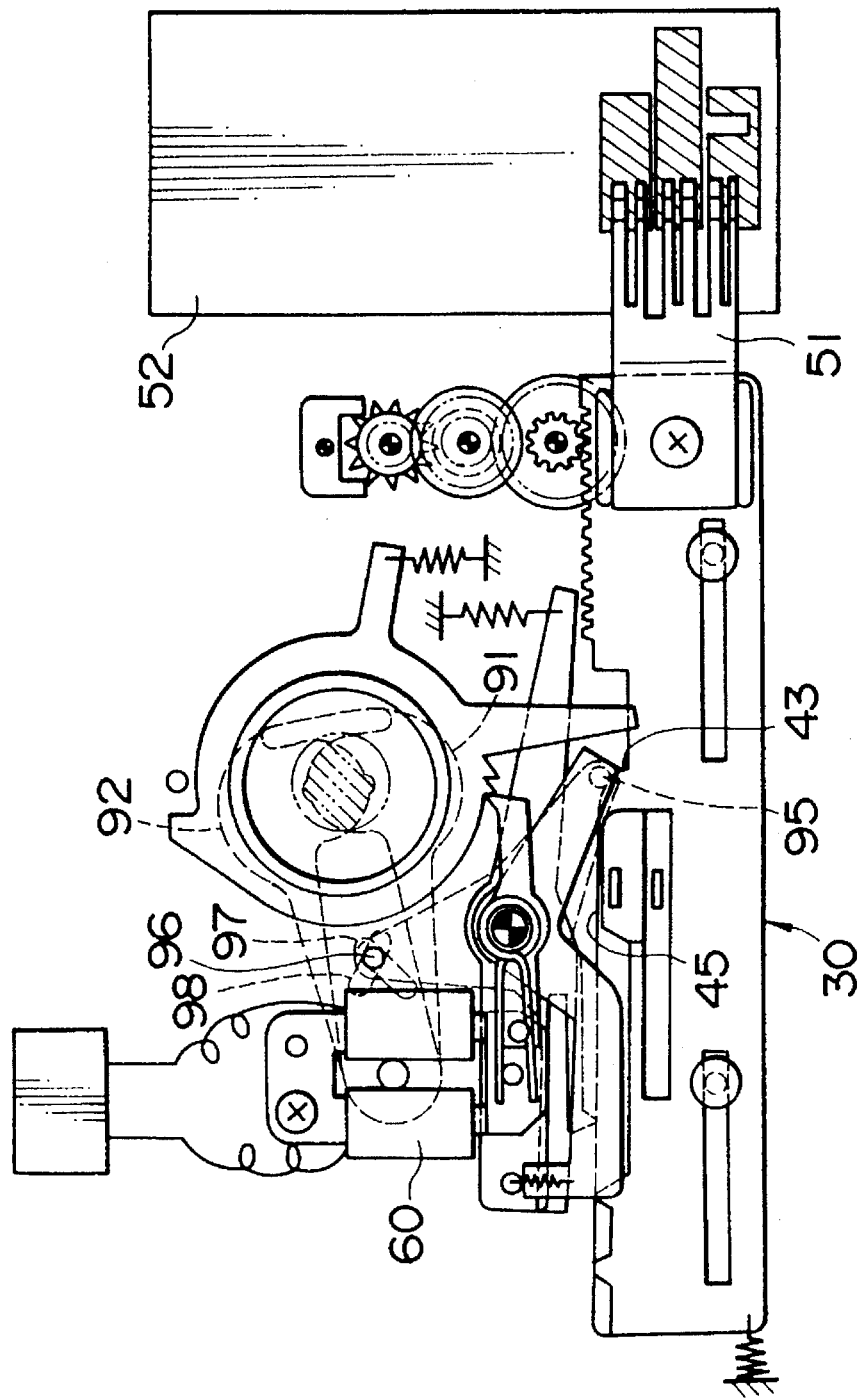
FIG. 9 is a front view showing a condition where the shutter control plate is moved further leftward from the position shown in FIG. 8.

FIG. 9 shows a condition where the shutter control plate 30 is further moved leftward from the position shown in FIG. 8. As shown in FIG. 9, upon the leftward movement of the shutter control plate 30, the seventh pin 95 attached to the sector lever 90 is moved from a position where it engages with the flat cam surface 45 to a position where it engages with the sector cam surface 43 and therefore deviates downward. As a result, the sector lever 90 is rotated in the clockwise direction by the urging force of the sixth spring 94 and therefore the eighth pin 96 attached to the sector lever 90 is also rotated in the clockwise direction.

In accordance with this rotation of the eighth pin 96, the first and second shutter sectors 91 and 92 are opened with respect to each other or open the through hole 17 of the base plate 10. In other words, the exposure has been commenced.

At the beginning of the exposure, the switching plate 51 is moved to that position on the code plate 52 which is designated by the reference symbol III in FIG. 13. The shutter control circuit defines the exposure time with reference to the position III. Thereafter, the electromagnet 60 is energized or demagnetized when the appropriate exposure time corresponding to the photometry signal has expired, and establishes a condition shown in FIG. 10.

Hereinafter, the description of the profile of the sector cam surface 43 and the opening/closing operation of the first and second shutter sectors 91 and 92 will be given with reference to FIG. 14. It should be noted that FIG. 14 shows changes of the opening area defined between the first and second shutter sectors 91 and 92 and the height of the seventh pin 95 of the sector lever 90 according to the elapse of time. In FIG. 14, the change of the height of the seventh pin 95 according to the elapse of time is corresponds to the profile of the sector cam 43, since the shutter control plate 30 is moved in a substantially straight path as well as at a substantially constant speed.

In this embodiment, the vertical sectional shape of the sector cam surface 43 is constructed by a part of a circle, that is, the profile of the sector cam surface 43 is constructed by an arcuate surface. The highest end 43a of the sector cam surface 43 is successively and smoothly connected to the flat cam surface 45 of the shutter control plate 30, so that the more the given point on the sector cam surface 43 approaches to the lowest end 43b, the more the inclination of the tangent line at the given point becomes steep.

The sector cam surface 43' as indicated by a two dots and dashed line is formed to be inclined to the horizontal line such that it extends linearly from the highest end 43a to the lowest end 43b. The sector cam surface 43' is shown as a comparative example to the sector cam surface 43 in this embodiment. That is, the seventh pin 95 of the sector lever 90 is moved so as to be expressed by a solid line and points $P_0'$, $P_1'$, ... $P_6$ as the shutter control plate 30 moves leftward in this embodiment, while it is moved so as to be indicated by a two dots and dashed line and points $P_0'$, $P_1'$, ... $P_6'$ in the comparative example. It should be noted that the point $P_0$ is set to be the same height as the point $P_0'$, the point $P_1$ is set to be the same height as the point $P_1'$, ... the point $P_6$ is set to be the same height as the point $P_6'$.

In the case where the profile of the sector cam surface 43' is made to be planar in the comparative example, the opening rate of the aperture defined between the first and second shutter sectors 91 and 92 is set to be relatively fast when the size of the aperture is set to be small, or during the initial stage of the shutter release operation, and then gradually becomes slow as shown by the two dots and dashed line S. On the other hand, in this embodiment, since the sector cam surface 43 is set to be arcuate, the changing rate of the aperture is set to be relatively small while the size of the aperture is set to be small, and then gradually becomes small as shown by a solid line T. In other words, the change of speed of the size of the aperture in this embodiment is slower than that in the comparative example where the size of the aperture is set to be small.

It should be noted that each of the characters $Q_1$, $Q_2$, ... $Q_6$ indicates the size of the aperture defined between the first and second shutter sectors 91 and 92 corresponding to each of the points $P_1$, $P_2$, ... $P_6$ of the seventh pin 95, while each of the characters $Q_1'$, $Q_2'$, ... $Q_6'$ indicates the size of the aperture defined between the first and second shutter sectors 91 and 92 corresponding to each of the points $P_1'$, $P_2'$, ... $P_6'$ of the seventh pin 95. Further, the characters $Q_1$ and $Q_1 1'$ indicate the same size of the aperture, and also $Q_2$ and $Q_2'$, ... and $Q_6$ and $Q_6'$ represent the same size as the aperture.

As describe above, the present embodiment is constructed in a fashion such that the opening rate of the aperture is reduced when the aperture, which is defined between the first and second shutter sectors 91 and 92, is set to be small. Accordingly, the influence of the change of the aperture to the dispersion of the shutter speed in photographing under the high luminance is diminished, and as a result, the exposure accuracy is improved by decreasing the dispersion of the exposure.

Further, the opening rate of the aperture in the low luminance territory ($Q_5$ and $Q_6$), where the size of the aperture is set to be large in this embodiment, is faster than that ($Q_5'$ and $Q_6'$) in the comparative example. However, the problems based on the dispersion of the exposure may not occur since the opening rate of the aperture in this low luminance territory is set to be smaller than that in the high luminance territory.

Figure 10:
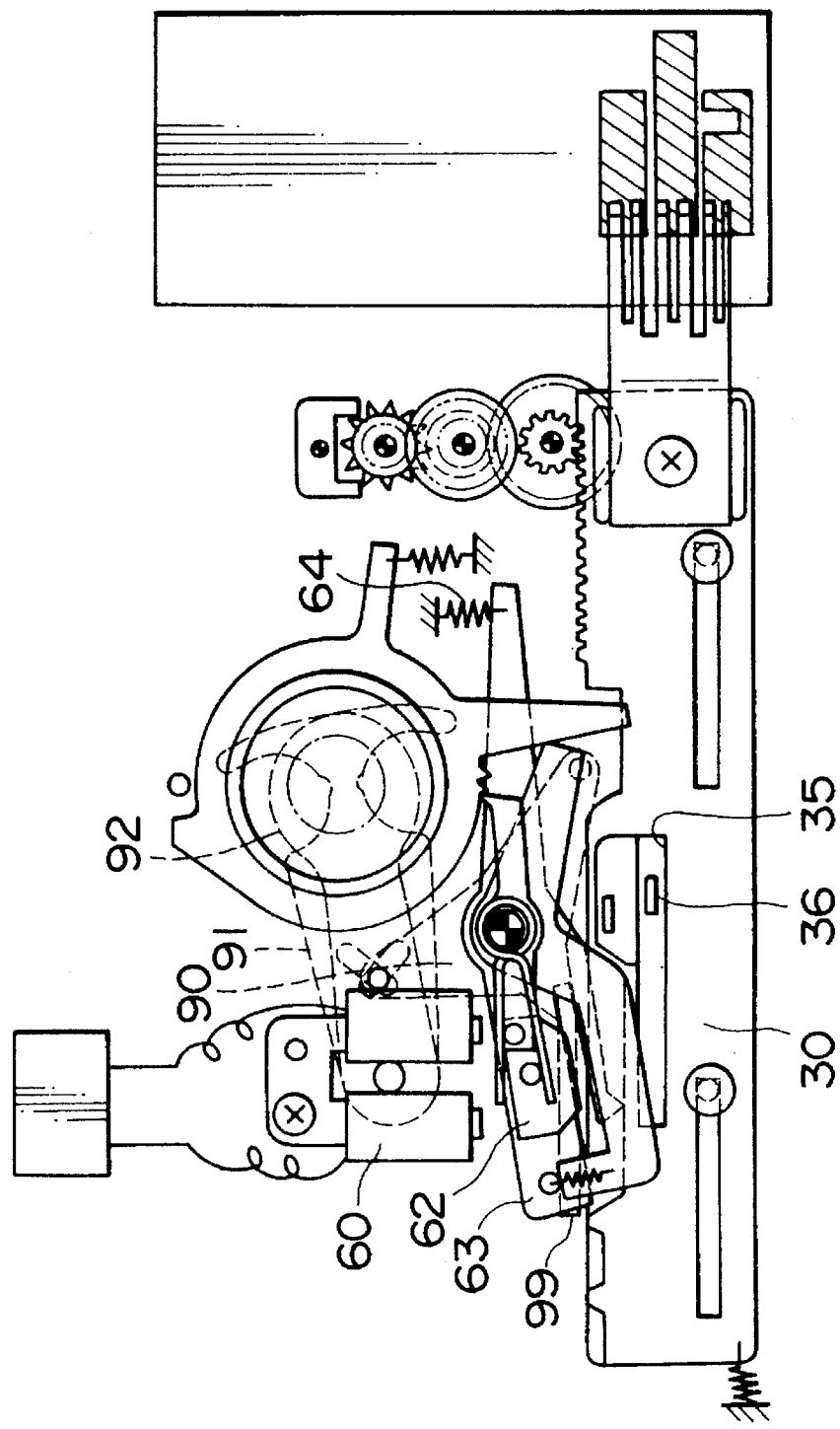
FIG. 10 is a front view showing a condition where the shutter control plate is moved further leftward from the position shown in FIG. 9, and the exposure is established.

FIG. 10 shows the condition where the exposure operation is completed. In this condition shown in FIG. 10, the movable block 62, i.e., the swingable lever 63, is rotated in the counterclockwise direction by the urging force of the fourth spring 64, when the electromagnet 60 is energized or de-magnetized. Since the third pin 65 provided on the rear surface of the swingable lever 63 contacts the third arm 99 of the sector lever 90 and pushes it down, the sector lever 90 is rotated in the counterclockwise direction in FIG. 1 and the first and second shutter sectors 91 and 92 are closed with respect to each other, and thus the exposure is completed. In FIG. 13, the two dots and dashed line L indicates a condition wherein the exposure according to the photometry signal is completed and the first and second shutter sectors 91 and 92 are closed faster than a condition designated by a solid line M.

After a certain period of time from when the electromagnet 60 is energized, the wind-up motor is actuated to start the wind-up operation of the film. Linking up with the wind-up operation, the charge lever 36 is moved rightward to engage the right end of the third elongated hole 35 formed in the shutter control plate 30, and thereby charging the shutter control plate 30 rightward against the urging force of the third spring 32.

Figure 11:
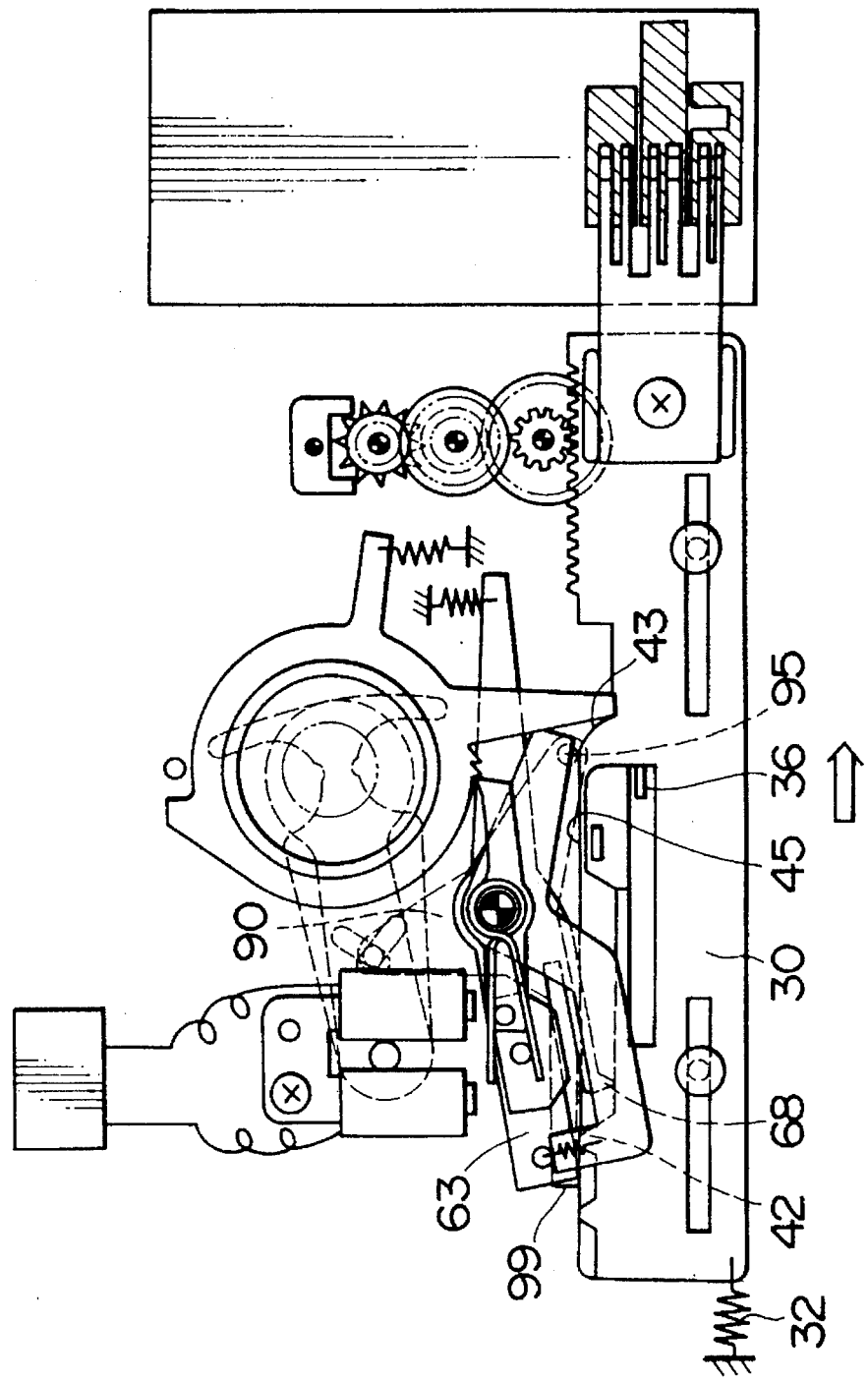
FIG. 11 is a front view showing a condition where the shutter control plate is charged rightward.

FIG. 11 shows a condition where the shutter control plate 30 is charged rightward against the urging force of the third spring 32. In this condition shown in FIG. 11, the seventh pin 95 of the sector lever 90 is transferred from a position for contacting the sector cam surface 43 of the shutter cam plate 30 to the flat cam surface 45 thereof, and whereby the sector lever 90 is rotated in the counterclockwise direction against the urging force of the sixth spring 94. Thereafter, the engaging arm 68 of the swingable lever 63 runs up on the summit of the second cam surface 42 and whereby the swingable lever 63 is rotated in the clockwise direction thereby to raise the third pin 65.

In this condition, where the third pin 65 is raised, since the seventh pin 95 of the sector lever 90 engages the flat cam surface 45 of the shutter control plate 30, the sector lever 90 is not rotated in the clockwise direction and holds the present rotational position against the urging force of the sixth spring 94. Accordingly, third pin 65 is separated from the upper surface of the third arm 99 of the sector lever 90. In other words, in this condition, the first and second shutter sectors 91 and 92 still remain in the closed condition.

FIG. 12 shows a condition where the shutter control plate 30 is moved further rightward. In this condition shown in FIG. 12, the engaging block 37 attached to the shutter control plate 30 runs under the other end 73 of the engaging lever 70. Simultaneously with such running under, the clutch (not shown) is released to cause the charge lever 36 to return leftward and the wind-up switch (not shown) is turned off to cause the wind-up motor to be stopped. As a result, the shutter control plate 30 is moved leftward by the urging force of the third spring 32 and stopped in a position where the engaging block 37 engages the other end 73 of the engaging lever 70.

As described above, the shutter charging operation is completed and the shutter control apparatus of the present embodiment is returned to the condition shown in FIG. 2.

On the other hand, in the case where the middle distance photographing is executed because the calculating circuit outputs a middle distance signal at the distance measuring operation therein, the electromagnet 60 is set to be de-energized just before the shutter control plate 30 is moved leftward to the position shown in FIG. 5. Accordingly, the electromagnetic 60 is magnetized thereby to produce the attraction force.

When the shutter control plate 30 is further moved leftward and the engaging pawl 74 of the engaging arm 68 attached to the swingable lever 63 is then released from the first cam surface 41, the swingable lever 63 is not rotated in the counterclockwise direction still remains in the present rotational position against the urging force of the fourth spring 64. That is, since the fifth pin 67 is set to a raised position, the hook 85 of the latch lever 80 is released from the first tooth 27 of the lens actuating member 20, and therefore, the lens actuating member 20 is rotated in the clockwise direction by the urging force of the second spring 25.

When the switching plate 51 is moved to a position on the code plate 52, which position is indicated by a character I in FIG. 13, the electromagnet 60 is energized and therefore is de-magnetized or removes the attraction force. Accordingly, the swingable lever 63 is rotated in the counterclockwise direction by the urging force of the fourth spring 64 and the latch lever 80 is also rotated in the counterclockwise direction. As a result, the hook 85 of the latch lever 80 engages that portion of the outer circumferential surface of the flange portion 38 of the lens actuating member 20 which is between the first and second teeth 27 and 28. In this engaging condition, the axial protrusions 23 are set to be in that position on the cam surface 13a which is deeper than that in short distance photographing, and the lens actuating member 20 takes a more drawn-in position in middle distance photographing than that in short distance photographing.

To the contrary, in case where the long distance photographing is executed because the calculating circuit outputs a long distance signal at the distance measuring operation therein, the electromagnet 60 is de-energized before the shutter control plate 30 is moved leftward to take a position shown in FIG. 4. It should be noted that this deenergized condition of the electromagnet 60 is maintained thereafter. Accordingly, even when the shutter control plate 30 is moved further leftward, the swingable lever 63 is stationary, thus the fifth pin 67 attached to the movable block 62 takes a raised position and the hook 85 of the latch lever 80 is released from the first tooth 27 of the lens actuating member 20.

As a result, the lens actuating member 20 is rotated in the clockwise direction by the urging force of the second spring 25 in accordance with the leftward movement of the shutter control plate 30. Then, the lens actuating member 20 is stopped in a position where the third arm, which is radially extending, engages the stopper 19 fixed to the base plate 10, as shown in FIG. 6. In this condition, the lens actuating member 20 takes a most drawn-in position.

It should be clear that the present invention is not limited to the embodiment described above, nor those illustrated in the drawings, and the invention can be modified without departing from the spirit and scope of the claimed invention.

For example, it is described that the first and second cam surfaces 41 and 42 and the sector cam surface 43 are formed on the outer peripheral surface (i.e., on the upper surface) of the shutter control plate 30 in the above mentioned embodiment. Instead of this construction, it would be possible to construct the shutter control plate 30 being provided with a cam groove and the cam surfaces 41, 42 and 43 being formed on the lateral surface of the cam groove.

Further, it should be clear that the actuator is not limited to the electromagnet 60, and it would be possible to employ the any construction which could reciprocally move the movable block 62.

Still further, it should be clear that the profile of the sector cam surface 43 is not limited to be constructed to an arcuate shape, and it would be possible to employ, e.g., a quadric surface or an arbitrary curved surface which is constructed to be capable of reducing the opening rate of the aperture which is defined between the first and second shutter sectors 91 and 92 while the size of the aperture is set to be small.

The present disclosure relates to subject matter contained in Japanese Utility Model Application No. 3-24991 (filed on Jan. 23, 1991) which is expressly incorporated herein by reference in its entirety.

What is claimed is:

1. An apparatus for controlling an operation of a shutter including at least one shutter sector by which a size of an aperture is defined, said apparatus comprising:

a shutter control member which is linearly moved in one direction upon a shutter opening operation;

a curved sector cam surface formed on the shutter control member and having a varying surface slope, said sector cam surface defining opening areas of a shutter aperture, and said varying surface slope defining varying opening speeds of said shutter aperture, a linkage for converting said varying surface slope to a corresponding varying opening speed of said shutter sector, said linkage including a cam follower element continuously and directly contacting and following said varying surface slope of said sector cam surface during said shutter opening operation, said opening speed of the aperture being regulated in response to different contacting positions of said element to said varying slope of said curved sector cam surface.

2. The apparatus according to claim 1, wherein
said profile of the sector cam surface comprises an arcuate surface.

3. The apparatus according to claim 1, wherein
said profile of the sector cam surface comprises a quadric surface.

4. The apparatus according to claim 1 wherein
said shutter control member is moved in a straight path and at a constant speed.

5. The apparatus according to claim 1, wherein said profile of said sector cam surface controls an opening speed of said aperture, while the size of the aperture is small.

6. The apparatus according to claim 1, wherein said profile increases an opening speed of said aperture, while the size of the aperture is large, during a final stage of the opening of the aperture.

7. The shutter control mechanism according to claim 1,
wherein an initial stage opening speed defined by said varying slope of said curved sector cam surface linearly moving in one direction is slower than an initial stage opening speed defined by a constant slope inclined surface defining the same opening areas and having the same speed of linear motion as said curved sector cam surface.

8. The shutter control mechanism according to claim 1,
wherein a final stage opening speed defined by said varying slope of said curved sector cam surface linearly moving in one direction is faster than a final stage opening speed defined by a constant slope inclined surface defining the same opening areas and having the same speed linear motion as said curved sector cam surface.

9. The apparatus according to claim 1, wherein
said sector cam surface is formed on the outer periphery of the shutter control member.

10. The apparatus according to claim 9, wherein
said shutter control member has an upper surface on which the sector cam surface is formed.

11. The apparatus according to claim 1 wherein said element includes:
a pin capable of directly contacting said sector cam surface, said size of the aperture being regulated by the contacting position of the pin with said sector cam surface.

12. The apparatus according to claim 11, wherein
said size of the aperture is changed on the basis of the movement of said contacting position in response to the movement of the shutter control member in one direction.

13. A shutter control mechanism for a camera, comprising:
a rectilinearly moveable curved surface having a varying slope, said curved surface defining opening areas of a shutter aperture, and said varying slope defining varying opening speeds of said shutter aperture;
means for generating constant speed rectilinear motion of said curved surface;
means for converting said constant speed rectilinear motion and said varying slope of curved surface into a swinging motion of an element having a varying swinging speed corresponding to said varying slope; and
means for opening a shutter aperture in response to said swinging motion of said element, at a varying opening speed determined by said varying swinging speed.

14. The shutter control mechanism according to claim 13,
wherein an initial stage opening speed defined by said combination of said constant speed rectilinear motion and said varying slope is slower than an initial stage opening speed defined by a constant slope inclined surface defining the same opening areas and having the same constant speed rectilinear motion as said curved surface.

15. The shutter control mechanism according to claim 13,
wherein a final stage opening speed defined by said combination of said constant speed rectilinear motion and said varying slope is faster than a final stage opening speed defined by a constant slope inclined surface defining the same opening areas and having the same constant speed rectilinear motion as said curved surface.

16. A shutter control mechanism for a camera, comprising:
a rectilinearly movable cam;
means for rectilinearly moving said movable cam at a constant speed during a shutter opening operation;
a curved cam surface formed in said cam, said curved cam surface defining opening areas of a shutter aperture and having a varying slope with reference to said rectilinear motion and said curved cam surface, said varying slope defining varying opening speeds of said shutter aperture;
a cam follower contacting said cam surface and following said varying slope of said cam surface between points of contact of said cam follower to said cam surface at a varying speed corresponding to said varying slope of said cam surface;
a linkage linked to said cam follower and moveable in response to the following of said cam follower, said linkage moving at a varying speed corresponding to said varying speed of said following of said slope so that each element of said linkage corresponds to said varying slope of said curved cam surface; and
a pair of shutter blades linked to said linkage and swung by said linkage at a varying swinging speed corresponding to said varying speed of said linkage, said shutter blades being linked to said linkage to move in mutually opposite directions to form an aperture opening at an opening speed corresponding to said varying speed of said pair of shutter blades.

17. The shutter control mechanism according to claim 16,
wherein an initial stage opening speed defined by said varying slope of said curved cam surface rectilinearly moving at a constant speed is slower than an initial stage opening speed defined by a constant slope inclined surface defining the same opening areas and having the same constant speed rectilinear motion as said curved cam surface.

18. The shutter control mechanism according to claims 17,
wherein a final stage opening speed defined by said varying slope of said curved cam surface rectilinearly moving at a constant speed is faster than a final stage opening speed defined by a constant slope inclined surface defining the same opening areas and having the same constant speed rectilinear motion as said curved cam surface.

19. A shutter control mechanism for a camera, comprising:
a curved cam surface having a varying slope for converting constant speed rectilinear motion to varying speed motion substantially normal to said constant speed rectilinear motion, said varying speed motion being defined by said varying slope and said curved cam surface defining opening areas of a shutter aperture;
a cam follower for following said varying slope of said curved cam surface at said varying speed;
a linkage for converting said varying speed to a corresponding varying swinging speed; and
at least one shutter blade linked to said linkage and swinging at said varying swinging speed, for forming an aperture that opens to said opening areas defined by said curved cam surface at a varying opening speed corresponding to said varying slope.

20. The shutter control mechanism according to claim 19,
wherein an initial stage opening speed defined by said varying slope of said curved cam surface having said constant speed rectilinear motion is slower than an initial stage opening speed defined by a constant slope inclined surface defining the same opening areas and having the same constant speed rectilinear motion as said curved cam surface.

21. The shutter control mechanism according to claim 20,
wherein the final stage opening speed defined by said varying slope of said curved cam surface having said constant speed rectilinear motion is faster than a final stage opening speed defined by a constant slope inclined surface defining the same opening areas and having the same constant speed rectilinear motion as said curved cam surface.

* * * * *

UNITED STATES PATENT AND TRADEMARK OFFICE
CERTIFICATE OF CORRECTION

PATENT NO. : 5,557,360
DATED : September 17, 1996
INVENTOR(S) : Takumi KOBAYASHI It is certified that error appears in the above-indentified patent and that said Letters Patent is hereby corrected as shown below:

At column 14, line 46 (claim 4, line 1), after "claim 1" insert ---,---.

At column 16, line 24 (claim 18, line 1), change "claims" to ---claim---.

Signed and Sealed this

Twentieth Day of May, 1997

*Attest:*

*Attesting Officer*

BRUCE LEHMAN

*Commissioner of Patents and Trademarks*